US010546499B2

(12) United States Patent
Marcoux et al.

(10) Patent No.: US 10,546,499 B2
(45) Date of Patent: Jan. 28, 2020

(54) SYSTEMS AND METHODS FOR NOTIFYING AN OCCUPANT OF A CAUSE FOR A DEVIATION IN A VEHICLE

(71) Applicant: Toyota Research Institute, Inc., Los Altos, CA (US)

(72) Inventors: John H. Marcoux, Ann Arbor, MI (US); Edwin B. Olson, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 362 days.

(21) Appl. No.: 15/421,557

(22) Filed: Feb. 1, 2017

(65) Prior Publication Data

US 2018/0217601 A1 Aug. 2, 2018

(51) Int. Cl.
*G08G 1/16* (2006.01)
*G05D 1/00* (2006.01)

(52) U.S. Cl.
CPC .......... *G08G 1/166* (2013.01); *G05D 1/0061* (2013.01); *G08G 1/167* (2013.01); *G05D 2201/0213* (2013.01)

(58) Field of Classification Search
None
See application file for complete search history.

(56) References Cited

U.S. PATENT DOCUMENTS

| 5,504,482 A * | 4/1996 | Schreder ............... G01C 21/26 340/988 |
| 7,813,888 B2 | 10/2010 | Vian et al. |
| 8,260,482 B1 | 9/2012 | Szybalski et al. |
| 9,792,817 B2 * | 10/2017 | Rider ..................... G08G 1/04 |
| 10,372,130 B1 * | 8/2019 | Kaushansky ...... G06K 9/00805 |
| 2009/0096597 A1 | 4/2009 | Avery, Jr. et al. |
| 2010/0076685 A1 * | 3/2010 | Eidehall ............... G01S 13/931 701/301 |
| 2011/0032119 A1 | 2/2011 | Pfeiffer et al. |

(Continued)

FOREIGN PATENT DOCUMENTS

| JP | 2007310698 A | 11/2007 |
| JP | 2016222143 A | 12/2016 |

(Continued)

*Primary Examiner* — David P. Merlino
(74) *Attorney, Agent, or Firm* — Christopher G. Darrow; Darrow Mustafa PC

(57) ABSTRACT

Systems, and methods for notifying an occupant of a determined cause for a deviation in a highly automated vehicle are described herein. The vehicle can detect a plurality of objects located in an external environment of the vehicle. The vehicle can determine a deviation from a current path of travel. The vehicle can follow a modified path of travel based on the determined deviation. The vehicle can determine a cause for the deviation by generating a simulation of the vehicle traveling along the current path of travel. The simulation may not include a first detected object of the plurality of detected objects. The vehicle can determine, using the generated simulation, whether the first detected object was the cause for the determined deviation. Responsive to determining that the first detected object was the cause for the determined deviation, the vehicle can notify an occupant of the cause for the determined deviation.

19 Claims, 5 Drawing Sheets

(56) References Cited

U.S. PATENT DOCUMENTS

| | | | | |
|---|---|---|---|---|
| 2014/0046585 A1* | 2/2014 | Morris, IV | ............ | G01C 21/00 |
| | | | | 701/468 |
| 2016/0342850 A1* | 11/2016 | Elimalech | .............. | G08G 1/161 |
| 2017/0113686 A1* | 4/2017 | Horita | .................. | B60W 30/12 |
| 2017/0329332 A1* | 11/2017 | Pilarski | ............ | B60W 50/0097 |
| 2018/0072323 A1* | 3/2018 | Gordon | ............ | B60W 50/0097 |
| 2019/0051173 A1* | 2/2019 | Kang | ............... | G08G 1/096791 |

FOREIGN PATENT DOCUMENTS

| WO | WO2014168557 A1 | 10/2014 |
|---|---|---|
| WO | 2015156146 A1 | 10/2015 |

\* cited by examiner

SYSTEMS AND METHODS FOR NOTIFYING AN OCCUPANT OF A CAUSE FOR A DEVIATION IN A VEHICLE

TECHNICAL FIELD

The subject matter described herein relates in general to notifications and, more particularly, to occupant notifications in vehicles.

BACKGROUND

Many vehicles are becoming increasingly automated. Some vehicles are configured to be controlled with minimal input from a driver. Other vehicles are configured to be operated by a driver, but the vehicle may still execute a deviation from the path being followed by the driver. For example, the vehicle's current path may be abruptly or suddenly changed to avoid a collision or accident, which the driver and/or occupants of the vehicle may or may not be aware of and are not notified of. The driver and/or occupants of the vehicle may become apprehensive and lose trust in their vehicle, since they do not know why the vehicle abruptly or suddenly changed its path.

SUMMARY

One embodiment includes a system for notifying an occupant of a determined cause for a deviation in a highly automated vehicle. The system can include at least one sensor positioned monitor an external environment of a vehicle. The system can include a notification system. The system can include one or more processors communicably coupled to the at least one sensor and notification system. The system can include memory communicably coupled to the one or more processors. The memory can store an environment evaluation module including instructions that, when executed by the one or more processors, cause the one or more processors to detect, via data from the at least one sensor, a plurality of objects located in the external environment of the vehicle. The memory can store an automated control module including instructions that, when executed by the one or more processors, cause the one or more processors to determine a deviation from a current path of travel, and to control one or more components of the vehicle to cause the vehicle to follow a modified path of travel based on the determined deviation. The memory can store a cause determination module including instructions that, when executed by the one or more processors, cause the one or more processors to determine which of the plurality of objects caused the deviation by causing the one or more processors to generate a simulation of the vehicle traveling along the current path of travel, the simulation not including a first detected object of the plurality of objects. The cause determination module can further include instructions that, when executed by the one or more processors, cause the one or more processors to determine, via the generated simulation, whether the first object was the cause for the determined deviation. The memory can store a cause notification module including instructions that, when executed by the one or more processors, cause the one or more processors to present, via the notification system, a notification to the occupant indicating the cause for the determined deviation responsive to the one or more processors determining, using the instructions included on the cause determination module, that the first object was the cause for the determined deviation.

Another embodiment includes a system for notifying an occupant of a determined cause for a deviation in a highly automated vehicle. The system can include at least one sensor positioned monitor an external environment of a vehicle. The system can include a notification system. The system can include one or more processors communicably coupled to the at least one sensor and notification system. The system can include memory communicably coupled to the one or more processors. The memory can store an environment evaluation module including instructions that, when executed by the one or more processors, cause the one or more processors to detect, via data from the at least one sensor, a plurality of objects located in the external environment of the vehicle. The memory can store an automated control module including instructions that, when executed by the one or more processors, cause the one or more processors to determine a deviation from a current path of travel, and to control one or more components of the vehicle to cause the vehicle to follow a modified path of travel based on the determined deviation. The memory can store a cause determination module including instructions that, when executed by the one or more processors, cause the one or more processors to determine which of the plurality of objects caused the deviation by causing the one or more processors to generate a first simulation of the vehicle traveling along the current path of travel, the first simulation not including a first detected object of the plurality of objects. The cause determination module can further include instructions that, when executed by the one or more processors, cause the one or more processors to determine, via the first generated simulation, whether the first object was the cause for the determined deviation. The cause determination module can further include instructions that, when executed by the one or more processors, cause the one or more processors to generate a second simulation of the vehicle traveling along the current path of travel responsive to determining that the first object was not the cause for the determined deviation, the second simulation not including a second detected object of the plurality of objects. The cause determination module can further include instructions that, when executed by the one or more processors, cause the one or more processors to determine, via the second generated simulation, whether the second object was the cause for the determined deviation. The memory can store a cause notification module including instructions that, when executed by the one or more processors, cause the one or more processors to present, via the notification system, a notification to the occupant indicating the cause for the determined deviation.

Another embodiment includes a method of notifying an occupant of a determined cause for a deviation in a highly automated vehicle. The method can include detecting a plurality of objects located in an external environment of a vehicle. The method can include determining a deviation from a current path of travel. The method can include controlling one or more components of the vehicle to cause the vehicle to follow a modified path of travel based on the determined deviation. The method can include generating a simulation of the vehicle traveling along the current path of travel, the simulation selectively including some of the plurality of detected objects. The method can include determining, using the generated simulation, whether a first detected object was the cause for the determined deviation. The method can include responsive to determining that the first detected object was the cause for the determined deviation, notifying an occupant of the cause for the determined deviation.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems and methods for notifying an occupant of a determined cause for a deviation in a highly automated vehicle are described herein. The vehicle can detect a plurality of objects located in an external environment of the vehicle. The vehicle can determine a deviation from a current path of travel. The vehicle can follow a modified path of travel based on the determined deviation. The vehicle can then determine which of the plurality of objects was a cause for the deviation. The vehicle can notify an occupant of the cause for the determined deviation. Thus, occupants of the vehicle can be made aware of a cause for the determined deviation. Systems and methods such as these can, in some arrangements, increase a confidence of drivers and/or occupants in their vehicle's abilities by making them aware of a cause for a deviation from the current path of travel.

Figure 1:
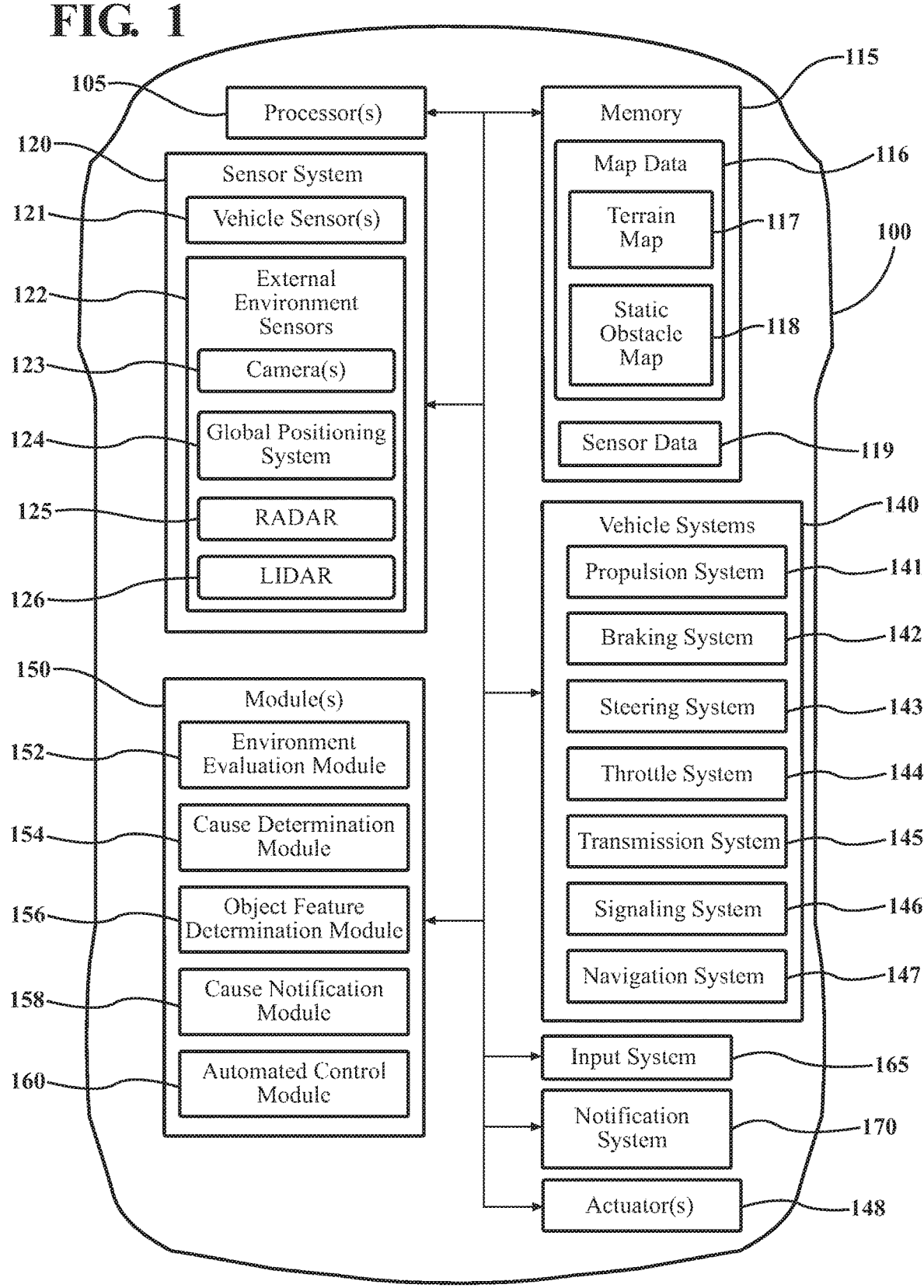
FIG. 1 is a block diagram of a vehicle within which the systems and methods disclosed herein may operate.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. The vehicle 100 can be configured to monitor an environment external to the vehicle 100.

The vehicle 100 includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 1-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The vehicle 100 includes one or more processor(s) 105. The processor(s) 105 are configured to implement or perform various functions described herein. In one or more arrangements, the processor(s) 105 can be a main processor of the vehicle 100. For instance, the processor(s) 105 can be an electronic control unit (ECU). The vehicle 100 can include memory 115 for storing one or more types of data. The memory 115 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 115 can be a component of the processor(s) 105, or the memory 115 can be operatively connected to the processor(s) 105 for use thereby. The term "operatively connected," as used throughout this description, can include direct or indirect connections, including connections without direct physical contact.

In one or more arrangements, the vehicle 100 can include one or more modules 150. Modules can be or include computer-readable instructions that, when executed by the processor(s) 105, cause the processor(s) 105 to perform the various functions disclosed herein. While the modules 150 will be described herein with reference to functions for purposes of brevity, it should be understood that the modules 150 include instructions that cause the processor(s) 105 to perform the described functions. Furthermore, although shown as separate from the memory 115, the modules 150 can be stored in memory 115. It should be noted the various modules can be remotely stored and accessible by the processor(s) 105, etc.

The vehicle 100 can include a sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 105, the memory 115, and/or another element of the vehicle 100 (including any of the elements shown in FIG. 1). The sensor system 120 can include, for example, vehicle sensors 121, external environment sensors 122, etc. As will be understood below, the sensor system 120 can be used by the processor(s) 105, along with instructions from various modules, to perform various functions.

Figure 2:
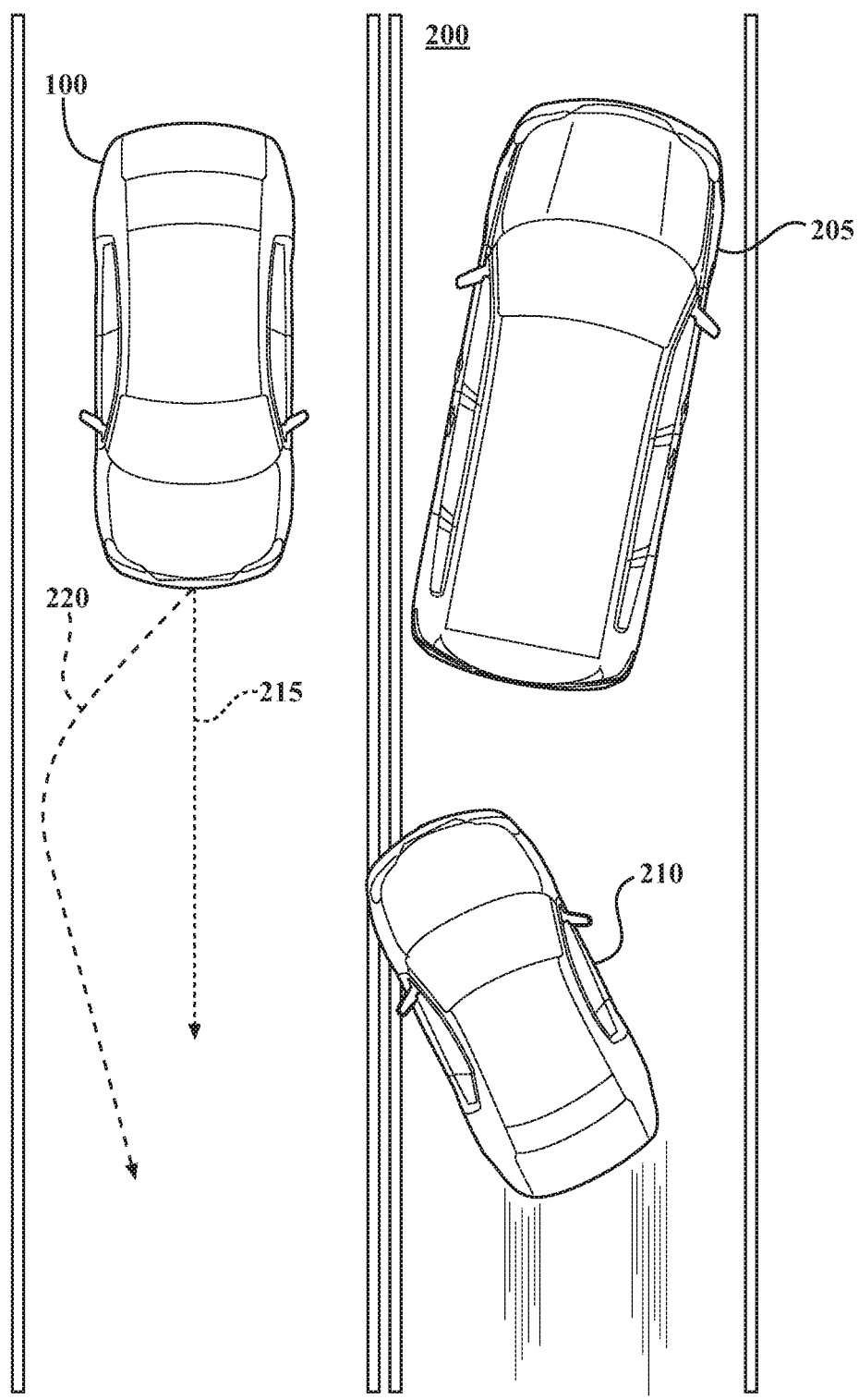
FIG. 2 is a top view of an example environment within which the system and methods disclosed herein may operate.

Referring now to FIG. 1 and FIG. 2, the vehicle 100 is shown in an example environment. As shown in FIG. 2, the vehicle 100 can be operating along a roadway. In this example, there can be two objects located in the external environment 200 of the vehicle 100. The two objects can include a first vehicle 205 and a second vehicle 210. Although the example provided herein includes two vehicles 205, 210, it should be noted that any number of objects, including objects other than vehicles, can be located in the external environment 200 of the vehicle 100. The vehicle 100 can be operating along a current path of travel 215.

The vehicle 100 can include an environment evaluation module 152. The environment evaluation module 152 can detect one or more objects located in the external environment 200 of the vehicle 100. The environment evaluation module 152 can receive data from one or more sensors in the sensor system 120. In one or more arrangements, the data received from the one or more sensors in the sensor system 120 may indicate the presence of one or more objects being located in the external environment 200 of the vehicle 100.

The environment evaluation module 152 can determine relative positional data for each of the one or more objects (e.g., the first and second vehicle 205, 210 in FIG. 2) located in the external environment 200 of the vehicle 100. The relative positional data can include, for example, the location, speed, acceleration, etc. of each of the objects relative to the vehicle 100. In one or more arrangements, using the sensor data received from the one or more sensors of the sensor system 120 over time, the environment evaluation module 152 can detect the relative positional data for each of the objects located in the external environment 200 of the vehicle 100. In one or more arrangements, the environment evaluation module 152 can receive relative positional data from the one or more objects (e.g., the first and second vehicle 205, 210) located in the external environment 200 using, for example, a communications system (e.g., V2V communication system). The relative positional data can also include changes in the location, speed, acceleration, etc. relative to the vehicle 100 over time.

The environment evaluation module 152 can include instructions for constructing a local map of the external environment 200 of the vehicle 100. The local map can include one or more objects detected in the external environment 200 and their relative positional data (e.g., location, velocity, acceleration, etc.) with respect to the vehicle 100. In the example environment shown in FIG. 2, the local map can include the first and second vehicle 205, 210 detected in the external environment 200 and their relative positional data with respect to the vehicle 100. In one or more arrangements, the relative positional data and/or local map can be stored, for example, on memory 115 and accessible by other components and/or modules of the vehicle 100.

The vehicle 100 can include an automated control module 160. As will be discussed in greater detail below, the automated control module 160 can determine a deviation from the current path of travel 215 of the vehicle 100 (e.g., a modified path of travel). In one or more arrangements, the current path of travel 215 can be a path that is being followed by the vehicle 100. Where the path of travel 215 is being followed by the vehicle 100, the vehicle may be operating in an autonomous or semi-autonomous mode. In one or more arrangements, the current path of travel can be a path that is being followed by a vehicle operator (e.g., driver). Where the path of travel 215 is being followed by the vehicle operator, the vehicle 100 may be operating in a semi-autonomous or manual mode.

In one or more arrangements, the automated control module 160 can determine a deviation from the current path of travel 215 based on the relative positional data and/or local map determined using the environment evaluation module 152. In one or more arrangements, the automated control module 160 can assign a value to locations in the external environment 200 of the vehicle 100. The value assigned to each of these locations can correspond to a risk associated with the vehicle 100 being at that particular location. For example, the value assigned to the location of static and/or dynamic objects in the external environment 200 can be large, indicating a high risk of collision with the vehicle 100. In one or more arrangements, the automated control module 160 can update the values assigned to locations in the environment surrounding the vehicle 100 as new static and/or dynamic objects are detected using the instructions from the environment evaluation module 152. Therefore, in the example shown in FIG. 2, the automated control module 160 can assign a value corresponding to a high risk of collision with the vehicle 100 for the locations of the first and second vehicle 205, 210.

The automated control module 160 can generate a plurality of paths of travel from a first pose and a second pose. The plurality of paths of travel can include, for example, maintaining the current path of travel 215, and one or more deviations from the current path of travel (e.g., one or more modified paths of travel 220 incorporating the one or more deviations). The automated control module 160 can calculate a cost associated with each of the plurality of paths from the first pose to the second pose. In one or more arrangements, the cost for each of the plurality of paths can correspond to the cost-to-go for each of the plurality of paths, taking into consideration values assigned to locations on the path associated with the risk and the overall target location (e.g., a general direction of travel for the vehicle 100 that results in the vehicle 100 reaching a destination). The automated control module 160 can select the path from the first pose to the subsequent pose corresponding to the minimum cost value. In so doing, the automated control module 160 can determine the deviation from the current path of travel by selecting, in one or more examples, a modified path of travel 220 including a deviation responsive to the cost for the modified path of travel being the minimum cost.

In the example shown in FIG. 2, the deviation can be based on at least one of the first and second vehicles 205, 210. The cost calculated by the automated control module 160 can correspond to the cost of the vehicle 100 operating along the current path of travel 215 with each of the plurality of objects (e.g., the first and second vehicles 205, 210) in the external environment 200. The automated control module 160 can also calculate a cost for the vehicle 100 traveling along the modified path of travel 220 including each of the plurality of objects being located in the external environment 200. The modified path of travel can incorporate or otherwise be associated with a deviation from the current path of travel 215. The automated control module 160 can determine the least costly path of travel. Responsive to the cost for the modified path of travel 220 being less than the cost for the current path of travel 215, the automated control module 160 can select the modified path of travel 220 for the vehicle 100 to take.

As will be discussed in greater detail below, the automated control module 160 can control one or more components of the vehicle 100 to cause the vehicle 100 to follow the modified path of travel 220 based on the determined deviation.

The vehicle 100 can include a cause determination module 154. The cause determination module 154 can determine which of the one or more objects located in the external environment 200 of the vehicle 100 caused the deviation from the current path of travel. As will be discussed in greater detail below, the determined cause of the deviation can be provided to occupants of the vehicle 100 via a notification.

Figure 3A:
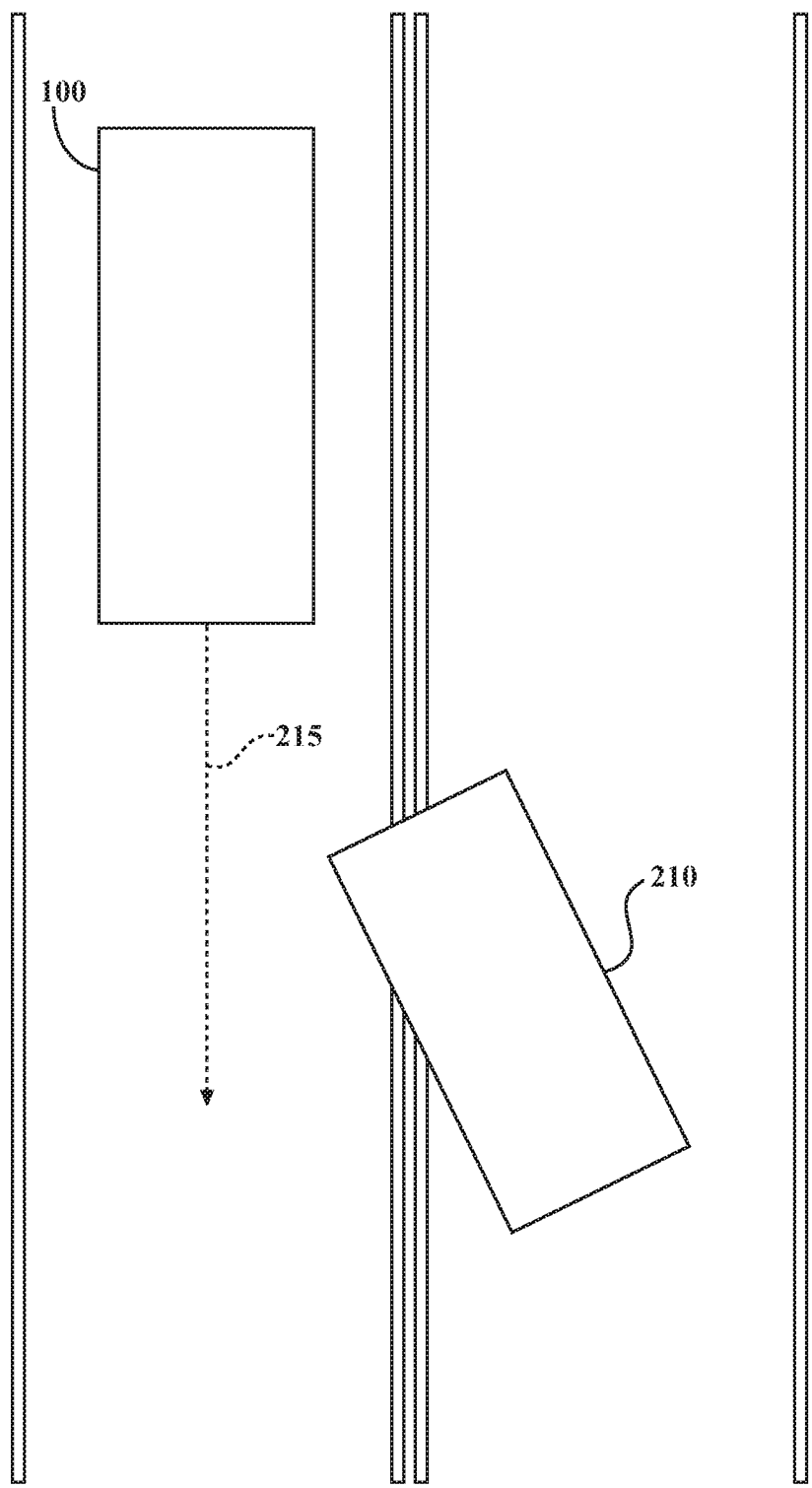
FIG. 3A is a simulation corresponding to the example environment shown in FIG. 2.
Figure 3B:
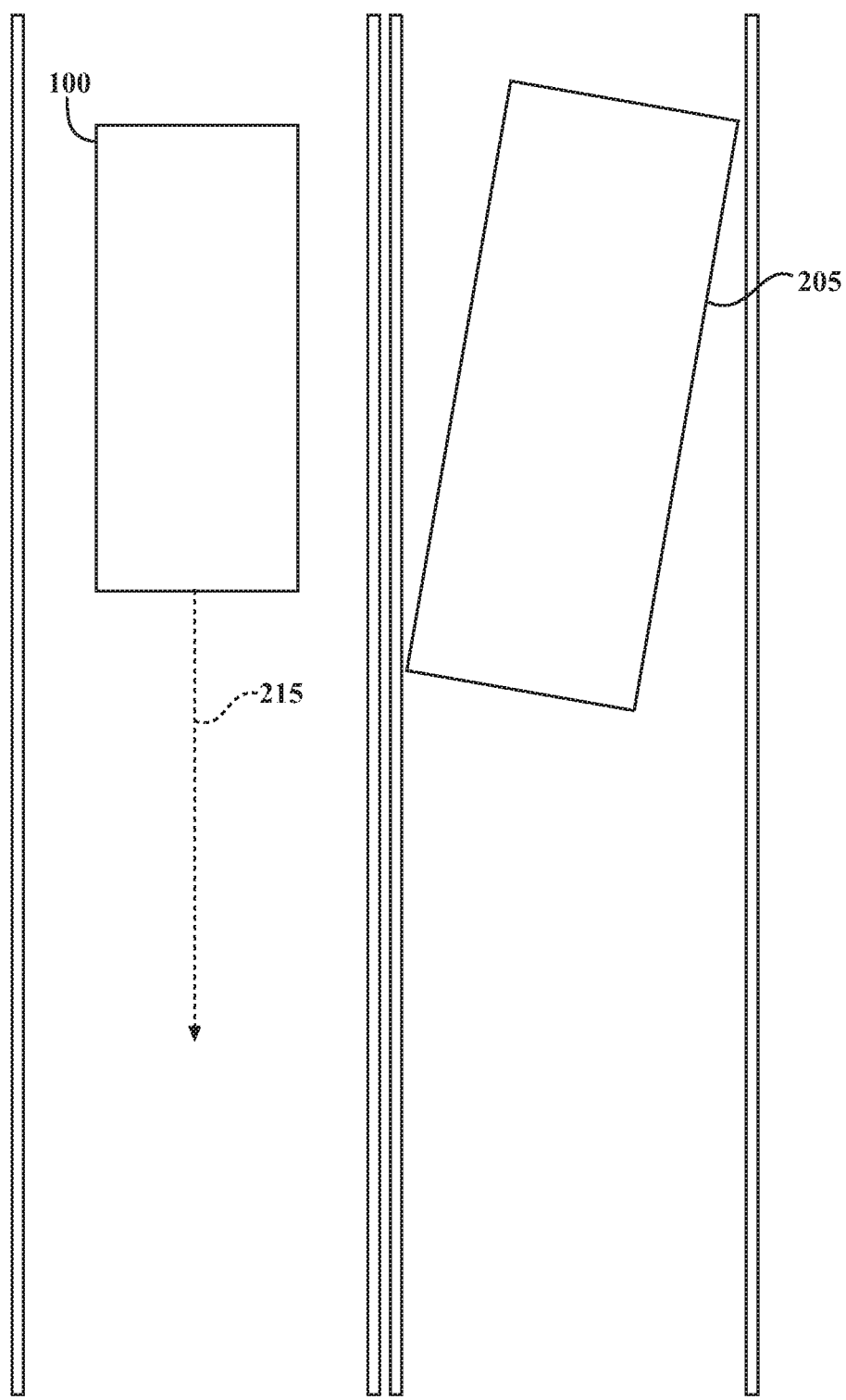
FIG. 3B is another simulation corresponding to the example environment shown in FIG. 2.

Referring now to FIG. 1 and FIGS. 3A-3B, the cause determination module 154 can generate one or more simulations. As shown in FIG. 3A-3B, the simulations can correspond to the actual environment of the vehicle 100 shown in FIG. 2.

To determine a cause for the deviation, the cause determination module 154 can generate a first simulation (such as that shown in FIG. 3A). The first simulation can be a simulation of the vehicle 100 traveling along the current path of travel without the deviation. The first simulation can incorporate data received from the environment evaluation module 152 (e.g., relative positional data and/or local map). In this regard, the first simulation can correspond to the actual environment of the vehicle 100 detected by the environment evaluation module 152. The cause determination module 154 can selectively include or otherwise incorporate one or more of the objects detected in the external environment 200 into the first simulation. As shown in FIGS. 2 and 3A, the vehicle 100 may detect, via at least one sensor from the sensor system 120, a first and second vehicle 205, 210 located in the external environment 200 of the vehicle 100, and the first simulation shown in FIG. 3A may selectively include some of the plurality of detected objects (e.g., the second vehicle 210) in the external environment 200 of the vehicle 100. In one or more arrangements, the first simulation may not, for example, include at least one (e.g., a first vehicle 205) of the plurality of objects detected in the external environment 200 of the vehicle 100. In examples where there are additional objects in the external environment 200, the additional objects may or may not be included in the first simulation.

In some arrangements, the cause determination module 154 can determine which of the plurality of detected objects to remove or include in the first simulation by randomly selecting an object. In some arrangements, the cause determination module 154 can determine which of the plurality of detected objects to remove or include in the first simulation based on the relative positional data for each of the plurality of objects. In this example, the cause determination module 154 can determine which of the plurality of detected objects to remove or include in the first simulation by, for example, selecting the closest object to the vehicle 100, selecting the object with the largest relative speed and/or acceleration, etc. While these examples are provided herein, it should be understood that the cause determination module 154 can determine which of the plurality of objects to remove or include in the first simulation in a number of ways. Therefore, the present disclosure should not be limited to these examples.

The cause determination module 154 can determine whether a first object was a cause for the determined deviation. In one or more arrangements, the cause determination module 154 can determine whether the first object was a cause for the determined deviation based on the generated simulation. In the example shown in FIG. 3A, the cause determination module 154 can determine whether the first vehicle 205 was a cause for the determined deviation based on the simulation of the vehicle 100 traveling along the current path of travel 215 and the first vehicle 205 not being present in the simulated external environment 200. In this regard, the first vehicle 205 would be a cause for the determined deviation responsive to, for example, the outcome of the simulation resulting in the vehicle 100 not taking the modified path of travel and continuing safely along the current path of travel 215.

The cause determination module 154 can simulate the vehicle 100 beginning at a first pose prior to the determined deviation and continuing to a second pose along the current path of travel 215 without the deviation. In one or more arrangements the cause determination module 154 can assign a value to locations in the simulated environment surrounding the vehicle 100. The value assigned to each of these locations can correspond to a risk associated with the vehicle 100 being at that particular location. For example, the value assigned to the location of static and/or dynamic objects in the simulated external environment can be large, indicating a high risk of collision with the vehicle 100. In the example shown in FIG. 3A, the value assigned to the location of the second vehicle 210 can correspond to a high risk of collision with the vehicle 100, and the location where the first vehicle 205 would be can be assigned a value corresponding to a low (or no) risk of collision.

In one or more arrangements, the cause determination module 154 can determine whether the object not included in the simulation was the cause for the determined deviation based on the calculated cost associated with the simulation. The cause determination module 154 can compare the cost associated with the generated simulation to the cost for the vehicle 100 traveling along the current path of travel including each of the plurality of objects. In one or more arrangements, the cost for the vehicle traveling along the current path of travel including each of the plurality of objects can be determined by the cause determination module 154. In one or more arrangements, the cost for the vehicle traveling along the current path of travel including each of the plurality of objects can be determined by the automated control module 160.

In one or more arrangements, the cause determination module 154 can determine that the object not included in the simulation was a cause for the determined deviation responsive to the costs being different from one another based on the comparison. In one or more arrangements, the cause determination module 154 can determine that the object was the cause for the determined deviation responsive to the cost for the generated simulation being less than the cost for the vehicle 100 traveling along the current path of travel 215 including each of the plurality of objects determined by the automated control module 160 and/or the cause determination module 154. The cost for the simulation without the object being less than the cost for the external environment including the object indicates that it is less costly for the vehicle 100 to travel on the current path of travel, and therefore at least the object not included in the simulation is a cause for the increased cost. In the example shown in FIG. 3A, the cost for the simulation without the first vehicle 205 will presumably be substantially the same as the cost for the vehicle 100 traveling along the current path of travel 215 including both the first and second vehicles 205, 210, since the vehicle 100 will still have to avoid a collision with the second vehicle 210.

Referring now to FIG. 1 and FIG. 3B, if the first object is determined not to be a cause for the deviation the cause determination module 154 can generate a subsequent simulation. The subsequent simulation can be similar to the first simulation (e.g., the vehicle 100 traveling along the current path of travel 215). The subsequent simulation may selectively include other detected objects from the plurality of objects. In one or more arrangements, the subsequent simulation may include different objects from those included in the first simulation. In one or more arrangements, the subsequent may not include a second object. Therefore, the subsequent simulation may not include a second detected object of the plurality of objects detected in the external environment 200 of the vehicle 100. In the example shown in FIG. 3B, the simulation may include the first vehicle 205 and not the second vehicle 210. In one or more arrangements, the subsequent simulation may include the first detected object that was previously-removed in the first simulation (e.g., the first vehicle 205). In this example, the cause determination module 154 can include the first detected object (and one or more other detected objects), but not the second detected object (e.g., the second vehicle 210) in the subsequent simulation. In one or more arrangements, the subsequent simulation may not include both the first detected object that was removed in the first simulation and the second object. In this example, the cause determination module 154 can include one or more of the plurality of objects detected in the external environment 200 except for the first and second detected objects.

In some arrangements, the cause determination module 154 can determine which of the plurality of detected objects to remove or include in the second simulation by randomly selecting an object. In some arrangements, the cause determination module 154 can determine which of the plurality of detected objects to remove or include in the second simulation based on the relative positional data for each of the plurality of objects. In this example, the cause determination module 154 can determine which of the plurality of detected objects to remove or include in the second simulation by, for example, selecting the second closest object to the vehicle 100, selecting the object with the second largest relative speed and/or acceleration, etc. While these examples are provided herein, it should be understood that the cause determination module 154 can determine which of the plurality of objects to remove or include in the second simulation in a number of ways. Therefore, the present disclosure should not be limited to these examples.

The cause determination module 154 can simulate the vehicle 100 beginning at a first pose prior to the determined deviation and continuing to a second pose along the current path without the deviation. In one or more arrangements, the cause determination module 154 can calculate a cost for current path of travel 215 in the subsequently generated simulation using a similar method as described with reference to the first simulation.

The cause determination module 154 can determine whether the second object was a cause for the determined deviation. In one or more arrangements, the cause determination module 154 can determine whether the second object was a cause for the determined deviation based on the subsequently generated simulation. In the example shown in FIG. 3B, the cause determination module can determine that the second object (e.g., the second vehicle 210) was a cause for the determined deviation since the outcome of the simulation shown in FIG. 3B would not need to avoid any collisions. In this regard, the outcome of the subsequent simulation shown in FIG. 3B would be different from the actual outcome where the vehicle 100 needed the determined deviation to avoid a collision.

In one or more arrangements, the cause determination module 154 can determine whether the second object (e.g., the second vehicle 210) was a cause for the determined deviation based on the calculated cost associated with the subsequently generated simulation. In this example, cause determination module 154 can compare the cost associated with the subsequently generated simulation to the cost for the vehicle 100 traveling along the current path of travel 215 including each of the plurality of objects as determined by the automated control module 160 and/or cause determination module 154. The cause determination module 154 can determine that the second object was a cause for the determined deviation responsive to the costs being different from one another based on the comparison. In one or more arrangements, the cause determination module 154 can determine that the second object was a cause for the determined deviation responsive to the cost associated with the simulation being less than the cost for the vehicle 100 traveling along the current path of travel including each of the plurality of objects.

The cause determination module 154 can iteratively generate simulations and selectively remove objects from the simulated external environment until the processor(s) 105 determine a cause for the deviation determined using the instructions from the automated control module 160. As stated, the processor(s) 105 can selectively include and remove objects from the simulated external environment responsive to determining that certain objects were not a cause for the determined deviation.

Although this example is provided, the cause determination module 154 can determine the cause for a deviation from a current path of travel 215 for the vehicle 100 in many other ways. For example, rather than detecting a change in cost, the cause determination module 154 can remove all objects from the simulation except for one object. In one or more arrangements, the cause determination module 154 can generate a simulation of the vehicle 100 traveling along the current path of travel. In this simulation, the simulated environment may only include one object. The cause determination module 154 can determine whether the object was a cause for the deviation. The cause determination module 154 can calculate a cost for the vehicle 100 traveling along the current path of travel only including the object. The cause determination module 154 can compare the calculated cost associated with the simulation to the cost for the vehicle 100 traveling along the current path of travel including each of the plurality of objects. Responsive to the costs being substantially the same, the cause determination module 154 can determine that the object included in the simulation was a cause for the determined deviation. In the example simulation shown in FIG. 3A, only the second vehicle 210 is included in the external environment 200 of the vehicle 100. The cause determination can calculate the cost for the vehicle 100 traveling along the current path of travel 215 with only the second vehicle 210 in the external environment 200. The cause determination module 154 can compare the calculated cost associated with the simulation to the cost for the vehicle 100 traveling along the current path of travel including each of the first and second vehicles 205, 210. In this example, the costs may be substantially the same, since the vehicle 100 will still need to deviate from the current path of travel 215 to avoid a collision with the second vehicle 210. Therefore, the cause determination module 154 can determine that the second vehicle 210 was a cause for the deviation.

While the examples described herein disclose "a cause", it should be understood that any given deviation may be a result of multiple causes. Therefore, the determined cause may only be the direct cause for the deviation. Further, where there are multiple causes for a deviation, the cause determination module 154 can iteratively generate simulations to determine each of the causes for the deviation. For example, the processor(s) 105 can, using instructions from the cause determination module 154, remove two or more objects from the simulated external environment to determine whether the two or more objects were causes for the deviation. In this example, the vehicle 100 can notify occupants of each the multiple causes for the deviation. The present disclosure should not therefore be limited to notifying an occupant of a singular cause for a deviation, and includes notifying occupants of multiple causes for a determined deviation.

The cause determination module 154 can, in some examples, determine both a direct and indirect cause for a deviation. In this example, the direct cause for the deviation can be the cause previously determined by the cause determination module 154. The direct cause can therefore be an action by an object that directly resulted in the determined deviation. The indirect cause can be an action by a first object that resulted in an action by a second object, and the action by the second object directly resulted in the determined deviation. The cause determination module 154 can determine the indirect cause by comparing the relative positional data for the first and second objects. For illustration purposes, the following example assumes that the second object was the direct cause for the determined deviation, which was previously determined by the cause determination module 154. Referring to the environment shown in FIG. 2, the cause determination module 154 can use the relative positional data for the first vehicle 205 and the second vehicle 210 for determining the indirect cause for a determined deviation. The relative positional data for the first vehicle 205 can include a relative location, speed, acceleration, etc. of the first vehicle 205 relative to the vehicle 100. Likewise, the relative positional data for the second vehicle 210 can include the relative location, speed, acceleration, etc. of the second vehicle 210 relative to the vehicle 100. The cause determination module 154 can determine positional data for the first vehicle 205 relative to the second vehicle 210 by comparing the relative positional data for first and second vehicle 205, 210. In this example, the first vehicle 205 may have suddenly decelerated, which caused the second vehicle 210 to swerve and directly caused the determined deviation from the vehicle 100. The cause determination module 154 can determine the first vehicle 205 was an indirect cause based on a comparison of the relative acceleration for the first and second vehicles 205, 210. Responsive to detecting a large deceleration for the first vehicle 205 relative to the second vehicle 210, the cause determination module 154 can determine that the large relative deceleration of the first vehicle 205 was an indirect cause for the determined deviation. Therefore, the cause determination module 154 can determine that the first vehicle 205 was an indirect cause for the determined deviation, and the second vehicle 210 was a direct cause for the determined deviation. In examples such as this where there is a direct and at least one indirect cause for a determined deviation, the vehicle 100 can notify an occupant of the vehicle 100 of the direct and/or indirect cause for the determined deviation.

The vehicle 100 can include an object feature determination module 156. The object feature determination module 156 can determine one or more identifying features for at least one of the plurality of detected objects located in the external environment 200 of the vehicle 100. In one or more arrangements, the object feature determination module 156 can determine one or more identifying features only for the object determined to be the cause of the deviation. In this example, the processor(s) 105 can identify an object that was a cause for the determined deviation, and can determine, using instructions from the object feature determination module 156, one or more identifying features for the object that was a cause for the determined deviation. In one or more arrangements, the object feature determination module 156 can determine one or more identifying features for several of the plurality of objects (including but not limited to each of the plurality of objects) and the object determined to be the cause of the deviation.

The object feature determination module 156 can determine one or more identifying features for the at least one object using the data from at least one sensor from the sensor system 120. The one or more identifying features can include for example, a vehicle type (e.g., compact car, SUV, pick-up truck, sedan, motorcycle, etc.), color, make, model, etc. In one or more arrangements, where the at least one object is not a vehicle, the object feature determination module 156 can identify the type of object (e.g., bicyclist, pedestrian, etc.). In the example shown in FIG. 2, the first vehicle 205 may be determined to be a sport utility vehicle (SUV), and the second vehicle 210 may be determined to be a compact car. These features can be determined using, for example, machine vision and model matching algorithms.

The object feature determination module 156 can determine one or more identifying features for the at least one object using relative positional data determined using instructions from the environment evaluation module 152. In this example, the one or more identifying features can include, for example, a relative position, velocity, acceleration, etc. Further, the one or more identifying features can include identifying changes in relative location, velocity, acceleration, etc., as determined by the environment evaluation module 152.

The vehicle 100 can include a cause notification module 158. In one or more arrangements, the cause notification module 158 can present a notification to an occupant of the vehicle 100. The notification presented to the occupant may indicate a determined cause for the deviation. The notification can be presented to the occupant responsive to the processor(s) 105 determining, using instructions from the cause determination module 154, which object located in the external environment 200 of the vehicle 100 was a cause for the deviation.

The processor(s) 105 can be in communication with a notification system 170. The notification system 170 can be any device, component, or arrangement or groups thereof that enable information/data to be presented to a vehicle passenger or occupant (e.g. a person, a vehicle passenger, etc.). In one or more arrangements, the notification system 170 can be an interactive display. The interactive display can provide visual notifications to occupants of the vehicle 100. The interactive display can be, for example, a vehicle head-unit, a heads-up display, etc. In one or more arrangements, the notification system 170 can be in communication with an audio system for the vehicle 100. In this regard, the notification system 170 can be a dialogue management system. The dialogue management system can be configured to provide audible notifications to occupants of the vehicle 100.

The cause notification module 158 can provide, via the notification system 170, a notification (e.g., visual and/or audible notification) indicating which of the plurality of objects caused the deviation. In this example, the cause notification module 158 can receive one or more identifying features for, at least, the object that was a cause for the determined deviation. The notification can indicate which of the plurality of objects was a cause for the deviation by identifying the determined one or more identifying features for the object determined to be a cause for the deviation. In some examples, the notification can identify a plurality of features for the object determined to be a cause for the deviation. In one or more arrangements, the plurality of features can include a visual feature (e.g., object or vehicle type, vehicle color, make/model, etc.) and a positional feature corresponding to the relative positional data (e.g., vehicle's relative position, velocity, acceleration, etc.). The notification can identify the object's visual feature (for example, vehicle type), and the object's relative positional feature (for example, vehicle acceleration). In one example, the notification may state in part, "A cause for the deviation from the current path of travel was the compact vehicle that decelerated."

In examples where there is a direct and at least one indirect cause for the determined deviation, the cause notification module 158 can provide, via the notification system 170, a notification indicating both the direct and an indirect cause for the determined deviation. In this example, the cause notification module 158 can provide, via the notification system 170, a notification indicating both the direct and indirect cause for the determined deviation by identifying one or more identifying features for both the object that was the direct cause and the object that was the indirect cause for the determined deviation. The notification may identify the object that caused the direct cause. In one non-limiting example, the notification may state in part, "The sport utility vehicle's deceleration caused the compact vehicle to decelerate and change its position, which was a direct cause for the deviation."

Figure 4:
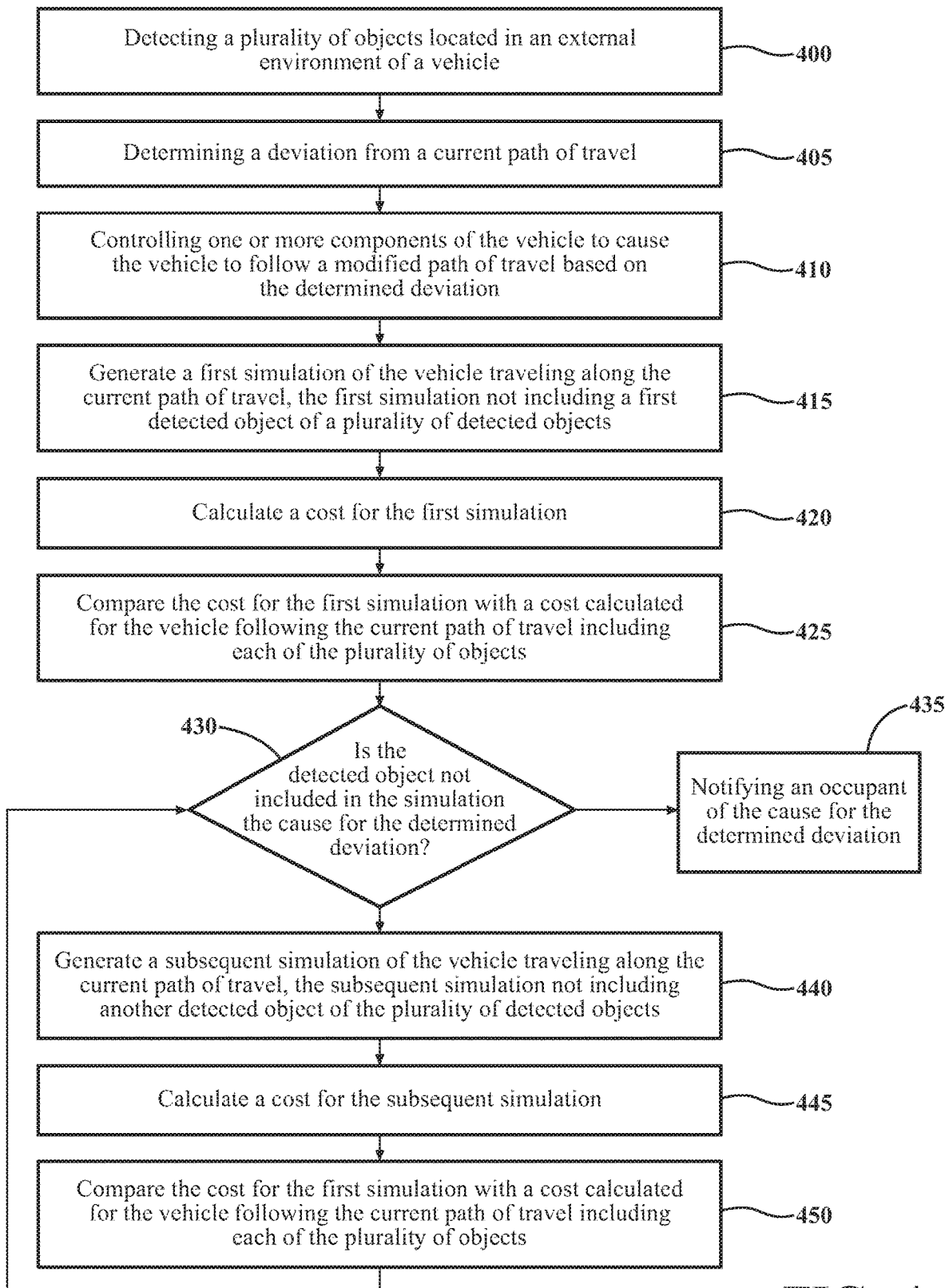
FIG. 4 is a flow diagram showing an example method of notifying an occupant of a determined cause for a deviation in an automated vehicle.

Now a method of notifying an occupant of a determined cause for a deviation in a highly automated vehicle will be described with reference to FIG. 4. The flowchart shown in FIG. 4 is only for exemplary purposes. The following disclosure should not be limited to each and every function block shown in FIG. 4. To the contrary, the method does not require each and every function block shown. In some examples, the method can include additional function blocks. Further, the method does not need to be performed in the same chronological order shown in FIG. 4. To the extent possible, reference will be made to the structure described above.

The method can begin at function block 400. At function block 400, the environment evaluation module 152 can detect a plurality of objects located in an external environment 200 of the vehicle 100. The environment evaluation module 152 can detect the plurality of objects using data from at least one sensor. In one or more arrangements, the environment evaluation module 152 can detect or determine relative positional data for each of the plurality of objects. The positional data can be used to generate a local map of the external environment 200 including each of the plurality of objects located therein. The method can proceed to function block 405.

At function block 405, the automated control module 160 can determine a deviation from the current path of travel for the vehicle 100. The automated control module 160 can determine the deviation from the current path of travel based on the positional data and/or local map determined using instructions from the environment evaluation module 152. In one or more arrangements, the automated control module 160 can calculate a cost for the vehicle 100 traveling on the current path of travel including each of the plurality of objects. The automated control module 160 can also be configured to calculate a cost for the vehicle traveling along a modified path of travel. The modified path of travel can include a deviation from the current path of travel. The automated control module 160 can select the path whose calculated cost value is lowest. In some examples, the cost for the modified path of travel may be lowest (such as the example shown in FIG. 2). In these examples, the automated control module 160 can select the path corresponding to the lowest cost (e.g., the modified path of travel). In this regard the automated control module 160 can determine a deviation from the current path of travel for the vehicle 100, and select a modified path of travel based on the determined deviation. The method can continue to function block 410.

At function block 410, the automated control module 160 can control one or more components of the vehicle 100 to cause the vehicle 100 to follow a modified path of travel based on the determined deviation. The method can continue to function block 415.

At function block 415, the cause determination module 154 can generate a first simulation of the vehicle 100 traveling along the current path of travel, rather than the modified path of travel. The first simulation can correspond to the actual external environment 200 of the vehicle 100. The first simulation may not include a first detected object from the plurality of detected objects detected by the environment evaluation module 152. The method can continue to function block 420.

At function block 420, the cause determination module 154 can calculate a cost for the first simulation. The cost associated with the first simulation can be a cost of the vehicle 100 continuing along the current path of travel including each of the plurality of objects located in the external environment 200 except for the first detected object. The method can continue to function block 425.

At function block 425, the cause determination module 154 can compare the cost for the first simulation with a cost calculated for the vehicle 100 following the current path of travel including each of the plurality of objects. In one or more arrangements, the cause determination module 154 can use the cost calculated for determining the deviation from the current path of travel at function block 405. In one or more arrangements, the cause determination module 154 can calculate a cost for the vehicle 100 following the current path of travel including each of the plurality of objects. In this example, the cause determination module 154 can generate an additional simulation to simulate the vehicle 100 following the current path of travel including each of the plurality of objects and calculate a cost therefor. Responsive to comparing the cost for the simulation to the cost for the vehicle 100 following the current path of travel including each of the plurality of objects, the method can continue to function block 430.

At function block 430, the cause determination module 154 can determine whether the detected object not included in the simulation was a cause for the determined deviation. The cause determination module 154 can determine whether the detected object not included in the simulation was a cause for the determined deviation based the simulation generated at function block 415. In one or more arrangements, the cause determination module 154 can determine whether the detected object not included in the simulation was a cause for the determined deviation based on the comparison performed at function block 425. In one or more arrangements, where the cost for the simulation is different from (e.g., less than) the cost for the vehicle 100 following the current path of travel including each of the plurality of objects, the cause determination module 154 can determine that the object removed in the simulation was a cause for the determined deviation.

If the cause determination module 154 determines that the detected object not included in the simulation was a cause for the determined deviation, the method can continue to function block 435.

At function block 435, the cause notification module 158 can present, via the notification system 170, a notification to an occupant of the vehicle 100. The notification presented to the occupant of the vehicle 100 can indicate the cause for the determined deviation. The notification can be a visual notification on an interactive display. Additionally or alternatively, the notification can be an audible notification on an audio system generated by a dialogue management system. The notification can indicate the cause for the determined deviation by identifying one or more features for the object determined to be the cause. The one or more features can be determined by the object feature determination module 156.

If the cause determination module 154 determines that the detected object not included in the simulation was not a cause for the determined deviation, the method can continue to function block 440.

At function block 440, the cause determination module 154 can generate a subsequent simulation of the vehicle 100 traveling along the current path of travel. The subsequent simulation can be similar to the first simulation generated at function block 415. The subsequent simulation may not include another detected object of the plurality of detected objects. The subsequent simulation may or may not include the first detected object that was previously removed in the first simulation. The method can continue to function block 445.

At function block 445, the cause determination module 154 can calculate a cost associated with the subsequent simulation. The cost for the subsequent simulation can be a cost associated with the vehicle 100 continuing along the current path of travel including each of the plurality of objects located in the external environment 200 except for the removed detected object(s). The method can continue to function block 450.

At function block 450, the cause determination module 154 can compare the cost for the subsequent simulation with the cost calculated for the vehicle 100 following the current path of travel including each of the plurality of objects in a similar manner to the comparison performed in function block 425. Responsive to comparing the cost for the subsequent simulation to the cost for the vehicle 100 following the current path of travel including each of the plurality of objects, the method can return to function block 430. The method can iteratively proceed through function blocks 430, 440-450 until, at function block 430, the cause determination module 154 determines which of the plurality of objects was a cause for the determined deviation.

While this method is described, it should be understood that this method can be modified or otherwise include different possible examples of determining a cause for a deviation from a current path of travel. For example, as previously stated, the cause determination module 154 can determine a cause for the deviation by removing all but one or more objects from the simulation. The cause determination module 154 can calculate a cost for this simulation, and compare this cost to the cost for the vehicle 100 traveling along the current path of travel including each of the plurality of objects. Responsive to the costs being substantially the same, the cause determination module 154 can determine that the objects remaining in the simulation were a cause for the deviation.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a path. In one or more arrangements, the vehicle 100 is configured one or more semi-autonomous operational modes in which one or more computing systems control one or more components of the vehicle 100 to cause the vehicle 100 to follow a modified path deviating from the current path being followed by the vehicle operator. In this example, the one or more computing systems control one or more components of the vehicle 100 to cause the vehicle 100 to follow a modified path responsive to determining a deviation from the current path being followed by the vehicle operator.

In one or more arrangements, the memory 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The memory 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 126 of the sensor system 120.

In some instances, at least a portion of the map data 116 and/or the sensor data 119 can be located in memory 115 located onboard the vehicle 100. Alternatively, or in addition, at least a portion of the map data 116 and/or the sensor data 119 can be located in memory 115 that is located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 105, the memory 115, and/or another element of the vehicle 100 (including any of the elements shown in FIG. 2). The sensor system 120 can acquire data of at least a portion of the external environment 200 of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS) 124, a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more external environment sensors 122 configured to acquire, and/or sense driving environment data. "Driving environment data" includes and data or information about the external environment 200 in which an autonomous vehicle is located or one or more portions thereof. For example, the one or more external environment sensors 122 can be configured to detect, quantify and/or sense obstacles in at least a portion of the external environment 200 of the vehicle 100 and/or information/data about such obstacles. Such obstacles can be stationary objects and/or dynamic objects. The one or more external environment sensors 122 can be configured to detect, measure, quantify and/or sense other things in the external environment 200 of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors can be part of the one or more external environment sensors 122 and/or the one or more vehicle sensors 121. However, it will be understood that the embodiments are not limited to the particular sensors described.

As an example, in one or more arrangements, the sensor system 120 can include one or more radar sensors 125, one or more LIDAR sensors 126, one or more sonar sensors, and/or one or more cameras 123. In one or more arrangements, the one or more cameras 123 can be high dynamic range (HDR) cameras or infrared (IR) cameras. In one or more arrangements, the one or more cameras 123 can be hyperspectral cameras.

The vehicle 100 can include an input system 165. An "input system" includes any device, component, system, element or arrangement or groups thereof that enable information/data to be entered into a machine. The input system 165 can receive an input from a vehicle passenger (e.g. a driver or a passenger). The vehicle 100 can include a notification system 170. A "notification system" includes any device, component, or arrangement or groups thereof that enable information/data to be presented to a vehicle passenger or occupant (e.g. a person, a vehicle passenger, etc.).

The vehicle 100 can include one or more vehicle systems 140. Various examples of the one or more vehicle systems 140 are shown in FIG. 2. However, the vehicle 100 can include more, fewer, or different vehicle systems. It should be appreciated that although particular vehicle systems are separately defined, each or any of the systems or portions thereof can be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a path for the vehicle 100. The navigation system 147 can include a global positioning system 124, a local positioning system or a geolocation system.

The vehicle 100 can include an automated control module(s) 160. The automated control module(s) 160 can communicate with the various vehicle systems 140. In one or more arrangements, the processor(s) 105 and/or automated control module(s) 160 can be operatively connected to communicate with the various vehicle systems 140 and/or individual components thereof. For example, returning to FIG. 2, the processor(s) 105 and/or the automated control module(s) 160 can be in communication to send and/or receive information from the various vehicle systems 140 to control the movement, speed, maneuvering, heading, direction, etc. of the vehicle 100. The processor(s) 105 and/or the automated control module(s) 160 can control some or all of these vehicle systems 140 and, thus, the vehicle 100 can be partially or fully autonomous.

The processor(s) 105 and/or the automated control module(s) 160 can control the navigation and/or maneuvering of the vehicle 100 by controlling one or more of the vehicle systems 140 and/or components thereof. For instance, when operating in an autonomous or semi-autonomous mode, the processor(s) 105 and/or the automated control module(s) 160 can control the direction and/or speed of the vehicle 100. The processor(s) 105 and/or the automated control module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The vehicle 100 can include one or more actuators 148. The actuators 148 can be any element or combination of elements operable to modify, adjust and/or alter one or more of the vehicle systems 140 or components thereof responsive to receiving signals or other inputs from the processor(s) 105 and/or the automated control module(s) 160. Any suitable actuator can be used. For instance, the one or more actuators 148 can include motors, pneumatic actuators, hydraulic pistons, relays, solenoids, and/or piezoelectric actuators, just to name a few possibilities.

The vehicle 100 can include one or more modules 150, at least some of which are described herein. The modules can be implemented as computer-readable program code that, when executed by the processor(s) 105, implement one or more of the various processes described herein. One or more of the modules 150 can be a component of the processor(s) 105, or one or more of the modules 150 can be executed on and/or distributed among other processing systems to which the processor(s) 105 is operatively connected. The modules 150 can include instructions (e.g., program logic) executable by one or more processor(s) 105. Alternatively, or in addition, the memory 115 can contain such instructions.

In one or more arrangements, one or more of the modules 150 described herein can include artificial or computational intelligence elements, e.g., neural network, fuzzy logic or other machine learning algorithms. Further, in one or more arrangements, one or more of the modules 150 can be distributed among a plurality of the modules described herein. In one or more arrangements, two or more of the modules 150 described herein can be combined into a single module.

The vehicle 100 can include one or more automated control module(s) 160. The automated control module(s) 160 can receive data from the sensor system 120 and/or any other type of system capable of capturing information relating to the vehicle 100 and/or the external environment 200 of the vehicle 100. In one or more arrangements, the automated control module(s) 160 can use such data to generate one or more driving scene models. The automated control module(s) 160 can determine position and velocity of the vehicle 100. The automated control module(s) 160 can determine the location of obstacles, obstacles, or other environmental features including traffic signs, trees, shrubs, neighboring vehicles, pedestrians, etc.

The automated control module(s) 160 can receive, and/or determine location information for obstacles (e.g., the vehicle 100) within the external environment 200 of the vehicle 100 for use by the processor(s) 105, and/or one or more of the modules 150 described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated control module(s) 160 can determine path(s), current autonomous driving maneuvers for the vehicle 100, future autonomous driving maneuvers and/or modifications to current autonomous driving maneuvers based on data acquired by the sensor system 120, driving scene models, and/or data from any other suitable source.

The automated control module(s) 160 can determine path(s) between a first pose and a subsequent pose. In one or more arrangements, the automated control module(s) 160 can assign a value to locations in the environment surrounding the vehicle 100. The value assigned to each of these locations can correspond to a risk associated with the vehicle 100 being at that particular location. For example, the value assigned to the location of static and/or dynamic objects in the external environment 200 can be large, indicating a high risk of collision with the vehicle 100. In one or more arrangements, the automated control module(s) 160 can update the values assigned to locations in the environment surrounding the vehicle 100 as new static and/or dynamic objects are detected in the environment by the environment evaluation module 152.

The automated control module(s) 160 can generate a plurality of paths from the first pose and the subsequent pose. The automated control module(s) 160 can calculate a cost associated with each of the plurality of paths from the first pose to the subsequent pose. In one or more arrangements, the cost for each of the plurality of paths can correspond to the cost-to-go for each of the plurality of paths, taking into consideration values assigned to locations on the path associated with the risk and the overall target location (e.g., a general direction of travel for the vehicle 100 that results in the vehicle 100 reaching a destination), among other factors. The automated control module(s) 160 can determine the minimum cost value for each of the plurality of paths from the first pose to the subsequent pose. The automated control module(s) 160 can select the path from the first pose to the subsequent pose corresponding to the minimum cost value.

It should be understood that the distance from the first pose to the subsequent pose can be any distance, from a relatively short distance (e.g., 1-5 m, 5-10 m, 10-20 m, etc.) to a relatively large distance (e.g., 20-50 m, 50-100 m, 100 m-1 km, etc.). In one or more arrangements, the first pose and subsequent pose can constitute a link to an overall target location. The automated control module(s) 160 can receive, from the navigation system 147, a starting and target location representing a starting and ending location, respectively. The automated control module(s) 160 can generate a plurality links, with the first link having a first pose at the starting location, the last link having a subsequent pose at the target location, and one or more intermediate links, each of which have their first pose at the preceding link's subsequent pose and their subsequent pose at the succeeding link's first pose. At each link, the automated control module(s) 160 can select a path from the first pose to the subsequent pose corresponding to a minimum cost.

The automated control module(s) 160 can determine one or more driving maneuvers to follow the selected path for the vehicle 100. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated control module(s) 160 can be configured can implement the determined driving maneuvers. The automated control module(s) 160 can cause, directly or indirectly, such autonomous driving maneuvers to be implemented. As used herein, "cause" or "causing" means to make, command, instruct, and/or enable an event or action to occur or at least be in a state where such event or action can occur, either in a direct or indirect manner. The automated control module(s) 160 can execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for notifying an occupant of a determined cause for a deviation in a vehicle, the system comprising:
   one or more sensors;
   one or more processors; and
   memory communicably coupled to the one or more processors and storing:
   an environment evaluation module including instructions that, when executed by the one or more processors, cause the one or more processors to detect a plurality of objects located in an external environment of the vehicle based, at least in part, on data received from the one or more sensors;
   an automated control module including instructions that, when executed by the one or more processors, cause the one or more processors to determine a deviation from a current path of travel, and to control one or more components of the vehicle to cause the vehicle to follow a modified path of travel based on the deviation;
   a cause determination module including instructions that, when executed by the one or more processors, cause the one or more processors to, subsequent to the vehicle following the modified path of travel, determine which of the plurality of objects caused the deviation; and
   a cause notification module including instructions that, when executed by the one or more processors, cause the one or more processors to present a notification to the occupant indicating which of the plurality of objects was determined to be the cause for the deviation.

2. The system of claim 1, wherein the instructions included on the cause determination module cause the one or more processors to determine which of the plurality of objects caused the deviation by causing the one or more processors to
   generate a simulation of the vehicle traveling along the current path of travel, the simulation not including a first detected object of the plurality of objects, and
   determine, via the generated simulation, whether the first object was the cause for the determined deviation.

3. The system of claim 2, wherein the cause determination module further includes instructions that cause the one or more processors to:
   calculate a cost associated with the generated simulation, and wherein
   the one or more processors determine whether the first object was the cause for the determined deviation based on the calculated cost associated with the generated simulation.

4. The system of claim 3, wherein the instructions included on the cause determination module cause the one or more processors to determine whether the first object was the cause for the determined deviation by causing the one or more processors to determine that the calculated cost associated with the generated simulation is less than a cost for the vehicle traveling along the current path of travel including each of the plurality of objects.

5. The system of claim 2, wherein the simulation is a first simulation, and wherein the cause determination module further includes instructions that cause the one or more processors to determine which of the plurality of objects caused the deviation by causing the one or more processors to
   generate, responsive to the first object not being the cause for the determined deviation, a second simulation of the vehicle traveling along the current path of travel, the second simulation not including a second detected object of the plurality of objects.

6. The system of claim 1, wherein the memory further stores:
   an object feature determination module including instructions that, when executed by the one or more processors, cause the one or more processors to determine one or more features for, at least, the object determined to be the cause for the deviation.

7. The system of claim 6, wherein the instructions included on the object feature determination module cause the one or more processors to determine one or more features for the object responsive to the one or more processors determining that the object was the cause for the determined deviation.

8. The system of claim 6, wherein the instructions stored on the cause notification module cause the one or more processors to present the notification to the occupant indicating the cause for the deviation, the notification indicating which of the plurality of objects caused the deviation by identifying the determined one or more features for the object causing the deviation to the occupant.

9. The system of claim 8, wherein the notification is one of a visual notification on an interactive display, and an audible notification on an audio system.

10. A system for notifying an occupant of a determined cause for a deviation in a vehicle, the system comprising:
    one or more sensors;
    one or more processors; and
    memory communicably coupled to the one or more processors and storing:
    an environment evaluation module including instructions that, when executed by the one or more processors, cause the one or more processors to detect a plurality of objects located in an external environment of the vehicle based, at least in part, on data received from the one or more sensors;
    an automated control module including instructions that, when executed by the one or more processors, cause the one or more processors to determine a deviation from a current path of travel, and to control one or more components of the vehicle to cause the vehicle to follow a modified path of travel based on the deviation;
    a cause determination module including instructions that, when executed by the one or more processors, cause the one or more processors to, subsequent to the vehicle following the modified path of travel, determine which of the plurality of objects caused the deviation by causing the one or more processors to
generate first and second simulations of the vehicle traveling along the current path of travel, the first simulation not including a first detected object of the plurality of objects and the second simulation not including a second detected object of the plurality of objects,
determine, via the first and second generated simulations, whether the first object or the second object was the cause for the determined deviation; and
a cause notification module including instructions that, when executed by the one or more processors, cause the one or more processors to present a notification to the occupant indicating the cause for the determined deviation.

11. The system of claim 10, wherein the instructions included on the cause determination module cause the one or more processors to determine which of the plurality of objects caused the deviation by causing the one or more processors to
calculate a cost for the vehicle traveling along the current path of travel in each of the first and second simulations, and wherein
the one or more processors determine whether the first object or the second object was the cause for the determined deviation based on the cost associated with the first and second simulations.

12. A method of notifying an occupant of a determined cause for a deviation in a vehicle having one or more sensors, the method comprising:
detecting a plurality of objects located in an external environment of the vehicle based, at least in part, on data received from the one or more sensors;
determining a deviation from a current path of travel;
controlling one or more components of the vehicle to cause the vehicle to follow a modified path of travel based on the determined deviation;
determining, subsequent to the vehicle following the modified path of travel, which of the plurality of objects caused the deviation; and
notifying the occupant which of the plurality of objects was determined to be the cause for the deviation.

13. The method of claim 12, wherein determining which of the plurality of objects caused the deviation comprises:
generating a simulation corresponding to the external environment of the vehicle, the simulation selectively including some of the plurality of objects; and
determining, based on the simulation, which of the plurality of objects caused the determined deviation.

14. The method of claim 13, further comprising:
calculating a cost associated with the simulation, wherein determining which of the plurality of objects caused the deviation is based on the calculated cost associated with the simulation.

15. The method of claim 14, wherein the simulation does not include a first detected object, and wherein determining which of the plurality of objects caused the deviation includes determining whether the first detected object caused the deviation based on the calculated cost associated with the simulation.

16. The method of claim 15, wherein determining the deviation from the current path of travel comprises determining the deviation from the current path of travel based on a cost calculated for the current path including each of the plurality of objects, and wherein determining whether the first detected object was the cause for the deviation is based on a comparison of the cost for the current path including each of the plurality of objects and the cost associated with the simulation.

17. The method of claim 16, wherein the simulation is a first simulation, and the method further comprises:
responsive to determining that the first detected object was not the cause for the deviation, generating a second simulation of the vehicle traveling along the current path of travel, the second simulation not including a second detected object.

18. The method of claim 17, further comprising
calculating a cost for the second simulation; and
determining whether the second detected object was the cause for the determined deviation based on a comparison of the calculated cost for the vehicle traveling along the current path of travel including each of the plurality of objects and the calculated cost for the second simulation, the second detected object being the cause responsive to the calculated cost associated with the second simulation being less than the calculated cost for the vehicle traveling along the current path of travel including each of the plurality of objects.

19. The method of claim 18, wherein the second simulation includes the first detected object, and wherein determining which of the plurality of objects caused the deviation includes determining whether the first detected object caused the deviation based on the calculated cost associated with the second simulation.

* * * * *